(12) United States Patent
Nakano

(10) Patent No.: US 6,587,174 B1
(45) Date of Patent: Jul. 1, 2003

(54) ACTIVE MATRIX TYPE LIQUID CRYSTAL DISPLAY

(75) Inventor: Akira Nakano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 299 days.

(21) Appl. No.: 09/616,868

(22) Filed: Jul. 14, 2000

(30) Foreign Application Priority Data

Jul. 15, 1999 (JP) .......................... 11-201688
Nov. 22, 1999 (JP) .......................... 11-332053

(51) Int. Cl.[7] .......................... G02F 1/1368
(52) U.S. Cl. .................. 349/139; 349/143; 349/43
(58) Field of Search .................. 349/139, 143, 349/42, 43

(56) References Cited

U.S. PATENT DOCUMENTS 4,167,307 A * 9/1979 Cirkler et al. ............. 349/114
5,568,163 A    10/1996 Okumura
5,644,415 A *  7/1997 Aoki et al. ................. 349/122
5,986,739 A * 11/1999 Kobayashi ................. 349/139
6,337,954 B1 *  1/2002 Soshi et al. ................ 349/142

FOREIGN PATENT DOCUMENTS

JP         5-34719     2/1993
JP        05-034719  * 12/1993 .......... G02F/1/136

* cited by examiner

Primary Examiner—Robert H. Kim
Assistant Examiner—P. R. Akkapeddi
(74) Attorney, Agent, or Firm—Brinks Hofer Gilson & Lione

(57) ABSTRACT

An active matrix type liquid display includes a main display and a sub-display having pixel areas. The pixel areas in the sub-display are different in size from the pixel areas in the main display. The active matrix type liquid display is configured so that the ratio of minimum space to maximum space is equal to or greater than one. The minimum space is the distance that separates the nearest ends of one pixel electrode and one gate electrode. The maximum space is the distance between opposite surfaces of paired electrodes.

15 Claims, 14 Drawing Sheets

ACTIVE MATRIX TYPE LIQUID CRYSTAL DISPLAY

BACKGROUND OF THE INVENTION

1. Technical Field of the Invention

The present invention relates to an active matrix type liquid crystal display, and more particularly to an active matrix type liquid crystal display having a main display area and a sub-display area which have pixel areas different from each other in size respectively.

2. Prior Art

As a conventional active matrix type liquid crystal display, there is known a liquid crystal display shown in FIG. 14. FIG. 14 is a plan view showing a thin film transistor (hereinafter, referred to as TFT) array substrate 140.

On the conventional TFT array substrate 140 for the active matrix apparatus, there are formed respectively: a display area 130 in which pixel areas 132 constituting pixels are arranged in a matrix shape; leader wiring 134 and scanning line terminals 136 for scanning lines for connecting scanning lines 101 in this display area 130 to an external gate driver (not shown); and leader wiring 135 and signal line terminals 137 for signal lines for connecting signal lines 119 in the display area 130 to an external source driver (not shown).

In terms of new functions capable of being added to the conventional active matrix type liquid crystal display, there has been advocated the necessity for providing another display area 31 (hereinafter, referred to as sub-display area) aimed at displaying, for example, character information in addition to a display area 30 (hereinafter, referred to as main display area) as shown in FIG. 1.

In this case, since high definition display is requested for the main display area 30, the pixel area 32 is made small, but in the sub-display area 31, it is not always necessary to cause the size of its pixel area 33 to coincide with that of the main display area because of the display object. Out of requests to display, for example, characters bigger for making them legible, design is made so as to cause the size of the pixel area 33 in the sub-display area 31 to be rather bigger than that of the pixel area 32 in the main display area 30.

On the other hand, in the active matrix type liquid crystal display, a liquid crystal layer is pinched between a pair of substrates oppositely arranged, and this liquid crystal layer is used as a display medium. In order to prevent the liquid crystal layer from being stuck, AC voltage in which DC voltage is not superimposed is applied to the liquid crystal layer, and this is used as display voltage. This AC voltage is applied to a pixel electrode mainly constituting the pixel area from the signal line through TFT which has turned ON through gate voltage from the scanning line. A steady DC voltage is applied to an opposite electrode which opposes to this pixel electrode through the liquid crystal layer. Thus, an electric field is imparted to the liquid crystal layer to change its refractive index whereby the liquid crystal layer becomes usable as a display medium.

However, a dynamic voltage drop $\Delta Vp$ occurs in potential $Vp$ of the pixel electrode when the gate voltage is changed in order to cause TFT to be in an OFF state, resulting from: a change in the dielectric constant of the liquid crystal in response to the field intensity; existence of parasitic capacity between gate electrode and drain electrode of TFT; existence of parasitic capacity between scanning line and pixel electrodes sandwiching insulating film therebetween; existence of parasitic capacity between scanning line and capacity electrodes sandwiching insulating film therebetween; existence of parasitic capacity between signal line and pixel electrodes sandwiching insulating film therebetween; existence of parasitic capacity between signal line and capacity electrodes sandwiching insulating film therebetween; and the like.

When the gate voltage $Vg$ is caused to change in order to cause TFT to be in an OFF state, a dynamic voltage drop $\Delta Vp$ occurs in potential $Vp$ of the pixel electrode. When the gate voltage $Vg$ is caused to change in order to cause TFT to be in an OFF state, electric charge is distributed between capacity of the liquid crystal layer between a pair of substrates, storage capacity consisting of the scanning line, gate insulating film thereon and capacity electrode, and the parasitic capacity to cause a voltage drop $\Delta Vp$ in the potential $Vp$ of the pixel electrode.

When the voltage drop $\Delta Vp$ occurs in the potential $Vp$ of the pixel electrode as described above, a difference will occur between positive and negative voltage amplitudes at the potential $Vp$ of the pixel electrode for driving the liquid crystal with center potential $Vsc$ of the signal voltage $Vs$ as a reference. If the same voltage is applied irrespective of the polarity of voltage, the liquid crystals have the same transmittance characteristic. Therefore, in, for example, a normally white, active matrix type liquid crystal display having high transmittance in a no-voltage applied state, it becomes lower in transmittance in polarity having a large voltage amplitude, and higher in polarity having a small voltage amplitude. For this reason, light and dark responsive to the transmittance are repeated, and these will be visually identified as flickers.

Variations in the dielectric constant of the liquid crystal, which is one factor for causing the voltage drop, in response to the field intensity relate to the physical properties of the liquid crystal and cannot be avoided. Also, as another factor, there are parasitic capacity of circuits, of which, existence of parasitic capacity between gate electrode and drain electrode of TFT cannot be structurally avoided in the current active matrix type liquid crystal display because gate insulating film formed between the electrodes forms capacity.

Also, the parasitic capacity between scanning line and pixel electrode cannot be structurally avoided in the current active matrix type liquid crystal display.

Thus conventionally, the potential at the opposite electrode is adjusted at the optimum such that the positive and negative voltage amplitudes for AC voltage for driving the liquid crystal are equal to each other, and the storage capacity is formed in parallel with respect to the capacity of the liquid crystal layer, whereby an attempt has been made to resolve the flickers.

Where there is, in addition to the main display area, provided a sub-display area having a pixel area different in size, there occurs a difference in voltage drop $\Delta Vp$ of pixel electrode between the main and sub-display areas because the value of the liquid crystal capacity or the parasitic capacity differs depending upon the size of the pixel area. This has led to a problem that flickers become prone to be visually identified to deteriorate the display quality.

SUMMARY OF THE INVENTION

The present invention has been achieved in order to solve the above-described problems, and is aimed to provide an active matrix type liquid crystal display capable of preventing flickers from occurring by applying the same potential to the opposite electrode without dividing the opposite electrode between main and sub-display areas which have pixel areas different in size respectively.

An active matrix apparatus according to the present invention is constructed such that there is sandwiched a liquid crystal layer between a pair of substrates oppositely arranged; on the surface of one substrate, a plurality of scanning lines and a plurality of signal lines are formed to intersect each other in a matrix shape; in the vicinity of a plurality of intersected portions formed by the plurality of scanning lines and signal lines, there are formed respectively TFTs having gate electrodes connected to the scanning lines, pixel electrodes connected to the TFTs, and capacity electrodes for forming storage capacity with the scanning lines and the storage capacity; on the surface of the other substrate on the liquid crystal layer side, there is formed an opposite electrode; there are provided a main display area having a plurality of pixel areas, each of the pixel areas being enclosed with the scanning lines and the signal lines and being equal to one another, and a sub-display area having pixel areas different in size from the pixel areas in the main display area having the plurality of pixel areas; and a ratio of minimum space between each pixel electrode, the scanning line for driving it and the gate electrode in the sub-display area, to the maximum space between opposite surfaces of paired substrates is set to one or more.

According to such a liquid crystal display, it is possible to reduce parasitic capacity Cgp (hereinafter, referred to as Cgp) between the pixel electrode, the scanning line and the gate electrode in the sub-display area, to ignore any influence on the voltage drop $\Delta Vp$ of the pixel electrode in the sub-display area due to this parasitic capacity, and to deduct one of design parameters concerning the voltage drop $\Delta Vp$ of the pixel electrode in the sub-display area. As the design parameters for the voltage drop $\Delta Vp$, there are storage capacity Cs and parasitic capacity Cgd (hereinafter, referred to as Cgd) between the gate electrode and the drain electrode of the TFT in addition. Of these, Cgd varies depending upon the channel width W and channel length L of the TFT, but a ratio of the minimum space between pixel electrode, scanning line and gate electrode, to the maximum space between opposite surfaces of the paired substrates is set to one or more. If Cgd cannot be ignored, $\Delta Vp$ cannot be designed by handling each of them as an independent parameter because Cgp also varies with Cgd. For this reason, since it becomes possible according to such a liquid crystal display to ignore the Cgp, it becomes easy to design the $\Delta Vp$, and it is possible to design such that the main and sub-display areas having pixel areas different in size respectively have $\Delta Vp$ in common, and therefore, to make potential at the opposite electrodes identical.

A maximum space between each pixel electrode, scanning line for driving it and gate electrode in the sub-display area is preferably set to a smaller value than a value obtained by deducting the length of the pixel electrode in the main display area in a direction perpendicular to the scanning line thereof from the length of the pixel electrode in the sub-display area in a direction perpendicular to the scanning lines thereof. This is because it becomes possible to make the potential at the opposite electrodes identical for the above reason, and the aperture ratio of the sub-display area is made larger than that of the main display area.

Another active matrix type liquid crystal display according to the present invention adopts, in an active matrix type liquid crystal display having main and sub-display areas having pixel areas different in size respectively, means for preventing flickers and sticking from occurring by making voltage drop $\Delta Vp$ of the pixel electrode equal to each other between the main and sub-display areas with respect to the identical opposite electrode potential without dividing the opposite electrode.

According to the present invention, there is provided an active matrix type liquid crystal display, in which there is sandwiched a liquid crystal layer between a pair of substrates oppositely arranged; on the surface of the one substrate, a plurality of scanning lines and a plurality of signal lines are formed to intersect each other in a matrix shape; in the vicinity of a plurality of intersected portions formed by the scanning lines and signal lines, there are formed respectively: TFTs having gate electrodes connected to the scanning lines, pixel electrodes connected to the TFTs through drain electrodes, and capacity electrodes for forming storage capacity with the scanning lines; and there are constituted a main display area and a sub-display area having pixel areas different from each other in size respectively, each of the pixel areas being enclosed with the scanning lines and signal lines, while on the surface of the other opposite substrate on the liquid crystal layer side, there is formed an opposite electrode, wherein there is adopted, as one means, a method for changing the storage capacity of the TFTs by making the channel widths of the TFTs different between the main and sub-display areas. As another means, there is adopted a method for constituting so as to make the storage capacity different between the main and sub-display areas.

A voltage drop $\Delta Vp$ of potential at the pixel electrode 11 can be expressed by the following equation (1):

$$\Delta Vp=(Vgh\times(Cgdon+Cgp)-Vgl\times(Cgdoff+Cgp)-Vs(Cgdon-Cgdoff))/(Cs+Clc+Cgdoff+Cgp) \quad (1)$$

where
 $\Delta Vp$: Voltage drop of potential at pixel electrode
 Vgh: High potential of gate voltage
 Cgdon: Parasitic capacity when TFT is ON
 Cgp: Parasitic capacity between scanning line and pixel electrode
 Vgl: Low potential of gate voltage
 Cgdoff: Parasitic capacity when TFT is OFF
 Vs: Potential of signal voltage
 Cs: Storage capacity
 Clc: Capacity of liquid crystal layer As shown in the equation (1), as factors for causing the voltage drop $\Delta Vp$ of potential at pixel electrode, the capacity Clc of liquid crystal layer, the parasitic capacity Cgd of TFT, the storage capacity Cs and the like are included.

When the sub-display area has a larger pixel area and the capacity Clc of the liquid crystal layer becomes larger in the equation (1), the voltage drop $\Delta Vp$ becomes smaller. The parasitic capacity Cgp between the scanning lines and the pixel electrode is capacity to be formed by a non-uniform electric field, and therefore, it is difficult to adjust the value in design. In order to recover the voltage drop $\Delta Vp$, there can be conceived a method for causing the voltage drop $\Delta Vp$ not to become smaller by making the parasitic capacity Cgdon of the TFT larger or the storage capacity Cs smaller. If the voltage drop $\Delta Vp$ does not change, voltage amplitudes based on positive and negative polarities in FIG. 4(c) will become equal to each other, thus making it possible to prevent flickers and sticking. Conversely, in the main display area having a smaller pixel area in size, the parasitic capacity Cgd of the TFT can be made smaller or the storage capacity Cs can be made larger.

A fluctuation $\Delta Vp$ in the pixel electrode potential depends also upon fall delay time of the gate signal. When the gate voltage is cut off to cause the TFT to be in an OFF state in FIG. 6(a), the voltage is not cut off in an acute-angled rectangle shape as indicated by solid line, but exponentially fluctuates as indicated by broken line to generate delay time (t) before the voltage disappears. If the fall delay time (t) of the gate signal is large, the TFT will not become completely OFF, and therefore, electric charge leaks from the pixel electrode through the TFT to cause the fluctuation in the pixel potential. If the voltage were cut off originally like an acute angle when the gate signal is caused to be in an OFF-state, such $\Delta Vp$ as indicated by solid line would occur in FIG. 6(c), and when delay time (t) is caused, the $\Delta Vp$ becomes smaller to become $\Delta Vp'$. This delay time (t) varies with various factors such as pixel capacity, wiring capacity or wiring resistance. Therefore, the main and sub-display areas having pixel areas different in size respectively become different also in the delay time (t), and therefore become different also in the $\Delta Vp'$.

Further, the delay of the scanning signal affecting the voltage drop $\Delta Vp$ of the pixel electrode is determined by the wiring resistance and wiring capacity of the scanning lines. Assuming the wiring resistance of the scanning lines to be Rg and the wiring capacity thereof to be Cg, a time constant T of the scanning lines is expressed as the product of Rg and Cg.

$$That\ is,\ T = Rg \times Cg \qquad (2)$$

This time constant T represents delay in the scanning signal, if both areas are equal in time constant T irrespective of the size of the pixel area, they will also become equal in signal delay, and accordingly also in $\Delta Vp'$ of FIG. 6(c). When, however, the size of the pixel area changes, the Cg changes, and the time constant also changes. Accordingly, as a countermeasure against flickers in a liquid crystal display having main and sub-display areas having pixel areas different in size, there is posed a problem how time constants T of each display area should be made equal to each other.

The Rg and Cg are values obtained by composing all resistance and capacity connected to the scanning lines respectively. In other words, as Rg component, wiring resistance is included in wiring resistance of the scanning lines themselves and the leader wiring. Also, as Cg component, there are included series capacity of liquid crystal layer capacity Clc and storage capacity Cs, parasitic capacity Cgds between gate electrode and drain electrode of TFT, and gate electrode, parasitic capacity Cgp between scanning lines and pixel electrodes, parasitic capacity Cx between scanning lines and signal lines and the like. Since these capacities constitute parallel capacity, the following relation is established:

$$Cg = (Clc \cdot Cs)/(Clc + Cs) + Cgds + Cgp + Cx \qquad (3)$$

In this case, when the size of the pixel area is small, the Clc becomes small, and the first term in the right-hand side of the equation (3) becomes small. If the Cg becomes smaller, T will become smaller from the equation (2). Therefore, in order to keep t constant, the Rg can be made larger from the equation (2), or the Cg can be made not smaller.

In order to make both areas equal in delay in the scanning signal as described above, there is a method, as one means, for making the main and sub-display areas different from each other in wiring resistance of the scanning lines. As another means, there is a method for making the main and sub-display areas different from each other in wiring capacity of the scanning lines by constituting these areas such that they are different in the area of the portion where the scanning lines and the signal lines overlap.

By adopting such a method as described above, it becomes possible to make the main and sub-display areas having pixel areas different in size respectively equal to each other in delay time (t) of the gate signal, and to design such that both have voltage drop $\Delta Vp$, in common, affected by delay in the gate signal. Therefore, voltage amplitudes based on positive and negative polarities can be made equal to each other and sticking and flickers can be prevented.

In other words, in FIG. 6(c), the main and sub-display areas are caused to have the fall delay time (t) of the gate voltage in common, and to have voltage amplitudes, in common, due to positive and negative polarities without changing the potential at the opposite electrode.

DETAILED DESCRIPTION OF THE PREFERRED EMBODIMENTS

Figure 1:
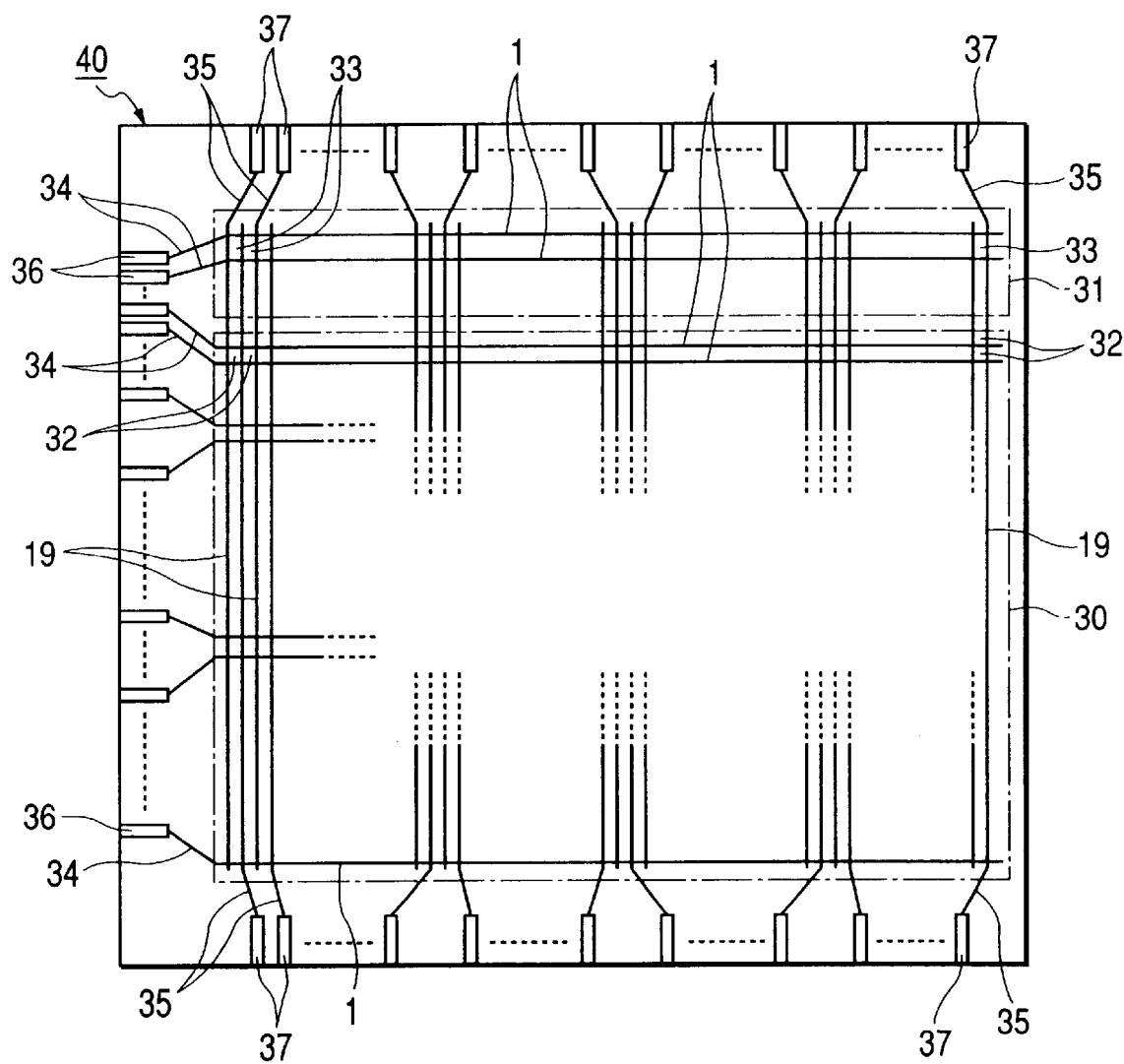
FIG. 1 is a plan view showing a TFT array substrate according to a first embodiment of the present invention.

Hereinafter, with reference to the drawings, the description will be made of a first embodiment according to the present invention. FIG. 1 shows a TFT array substrate 40 in an active matrix type liquid crystal display according to a first embodiment of the present invention.

On the surface of a TFT array substrate 40, there are formed a main display area 30 in which pixel areas 32 constituting pixels are arranged in a matrix shape, and a sub-display area 31 in which pixel areas 33 similarly constituting pixels are arranged in a matrix shape. Scanning lines 1 for scanning these pixel areas and signal lines 19 for supplying signals are formed in a lattice shape. The signal lines 19 are continuously wired without being discontinued between the main display area 30 and the sub-display area 31, which are different in size of pixel area.

In the present embodiment, the sub-display area 31 consisting of pixel areas 33, each of which is larger in size than each of the pixel areas 32 in the main display area 30, is formed in the upper part of the main display area 30 such that the widths of the pixel areas coincide with each other in a direction in which the signal lines 19 extend. More specifically, the pixel area in the main display area 30 has size of 40 μm in width×120 μm in length while the pixel area in the sub-display area 31 has size of 40 μm in width×400 μm in length.

All around the main display area 30 and the sub-display area 31, there are respectively formed leader wiring 34 of the scanning lines 1 brought out from the scanning lines 1 of each display area 30, 31 to terminals 36 of the scanning lines 1 for connecting to an external gate driver (not shown), and leader wiring 35 of the signal lines 19 brought out from the signal lines 19 of each display area 30, 31 to terminals 37 of the signal lines 19 for connecting to an external source driver (not shown). In this respect, as a case different from the present embodiment, there are some cases where a driving circuit is incorporated on the same TFT array substrate 40, and in this case, the leader wiring 34 from the scanning lines 1 and the leader wiring 35 from the signal lines 19 may be brought out to the output from this driving circuit.

Figure 2:
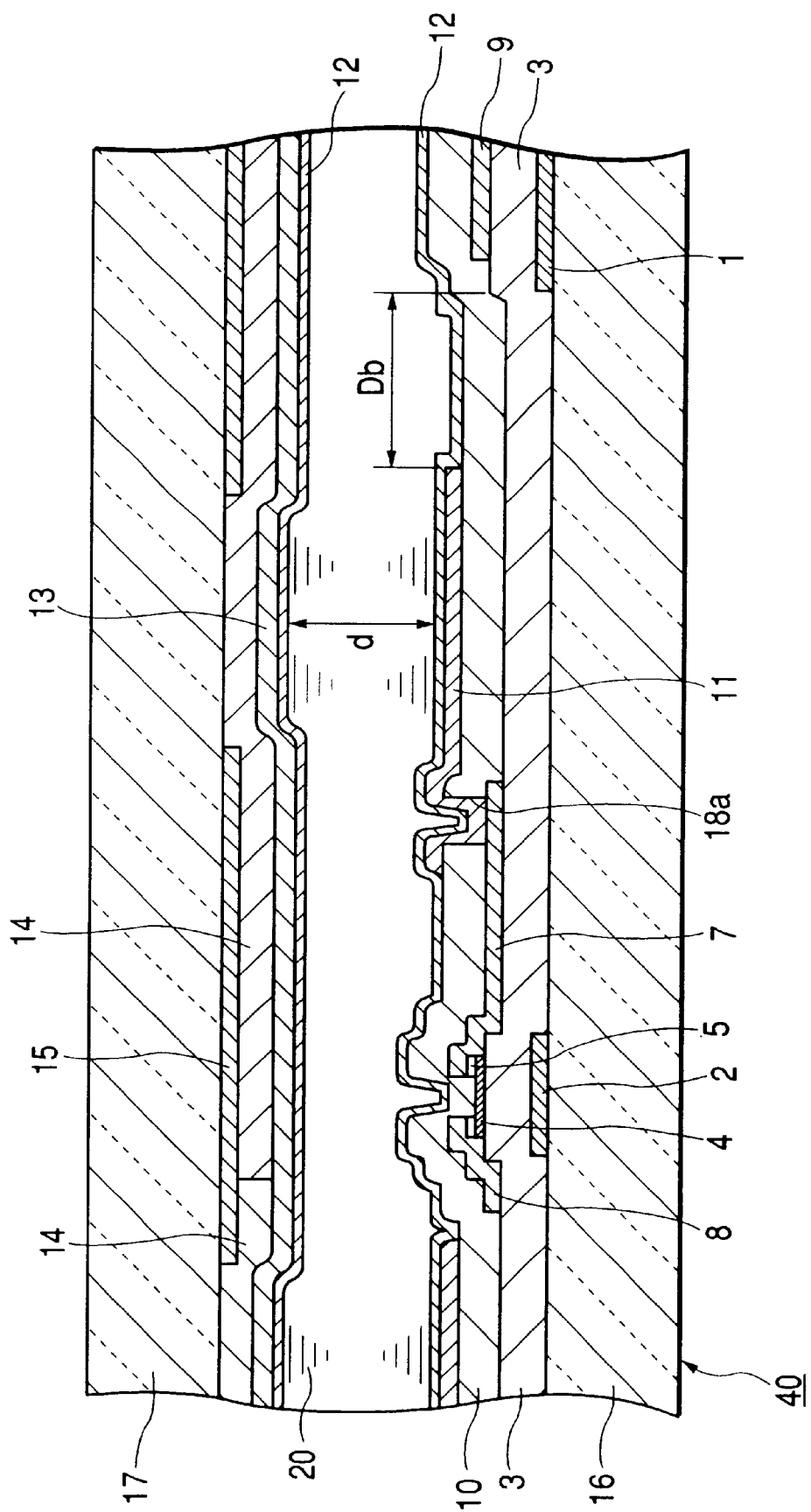
FIG. 2 is a sectional view showing a sub-display area portion of the liquid crystal display according to the first embodiment of the present invention.

In a liquid crystal display using the TFT array substrate 40, an opposite substrate 17 arranged to oppose to a substrate 16 for constituting a TFT array substrate 40 through a liquid crystal layer 20, as shown in FIG. 2, provided with a light-shielding black matrix 15, a color filter 14, and a transparent opposite electrode 13 made of indium tin oxide, similar to a pixel electrode 11. On a surface in contact with the liquid crystal, orientation film 12 is formed. Therefore, when voltage is applied between the pixel electrode 11 and the opposite electrode 13, it is arranged such that an electric field is applied to the liquid crystal layer 20, and that orientation control of liquid crystal molecules can be performed. This structure can be regarded as capacity (hereinafter, referred to as liquid crystal capacity) because it has the pixel electrode 11 and the opposite electrode 13 respectively as electrode, and has a liquid crystal, which is dielectric, therebetween.

Figure 3:
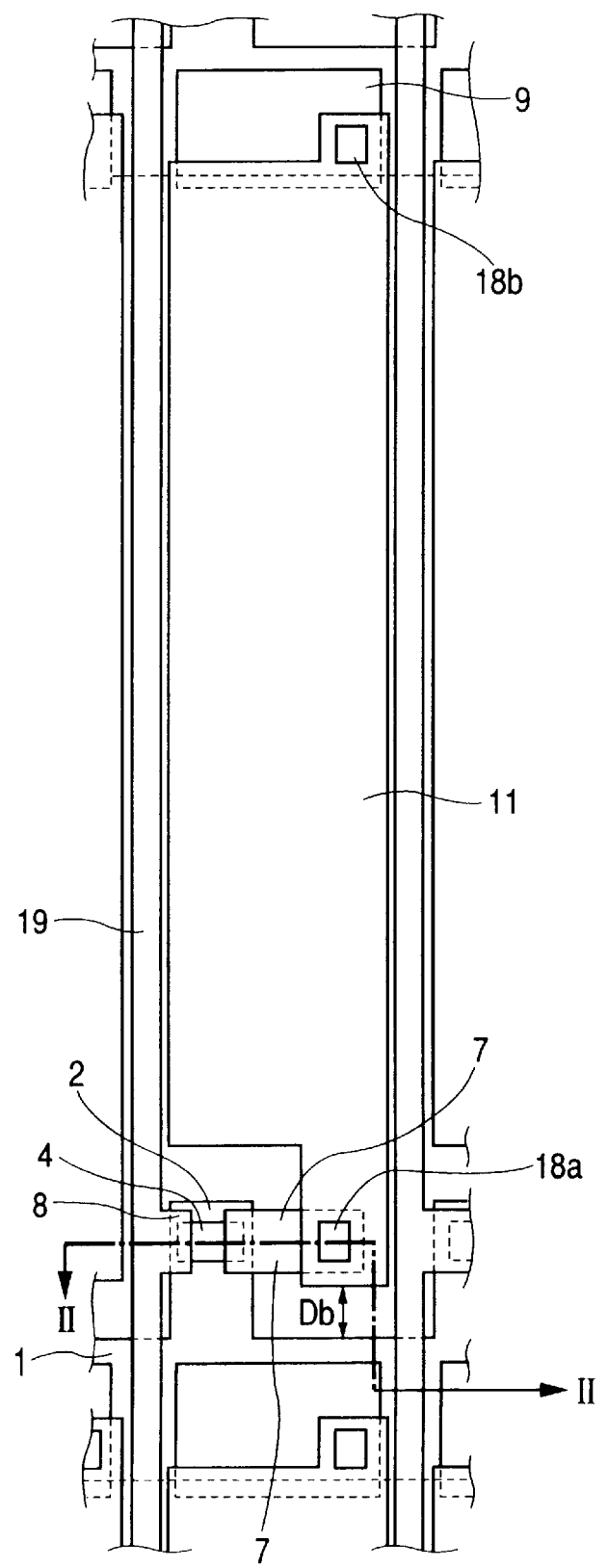
FIG. 3 is a plan view showing a pixel area of the sub-display area on the TFT array substrate shown in FIGS. 1 and 2.
Figure 4:
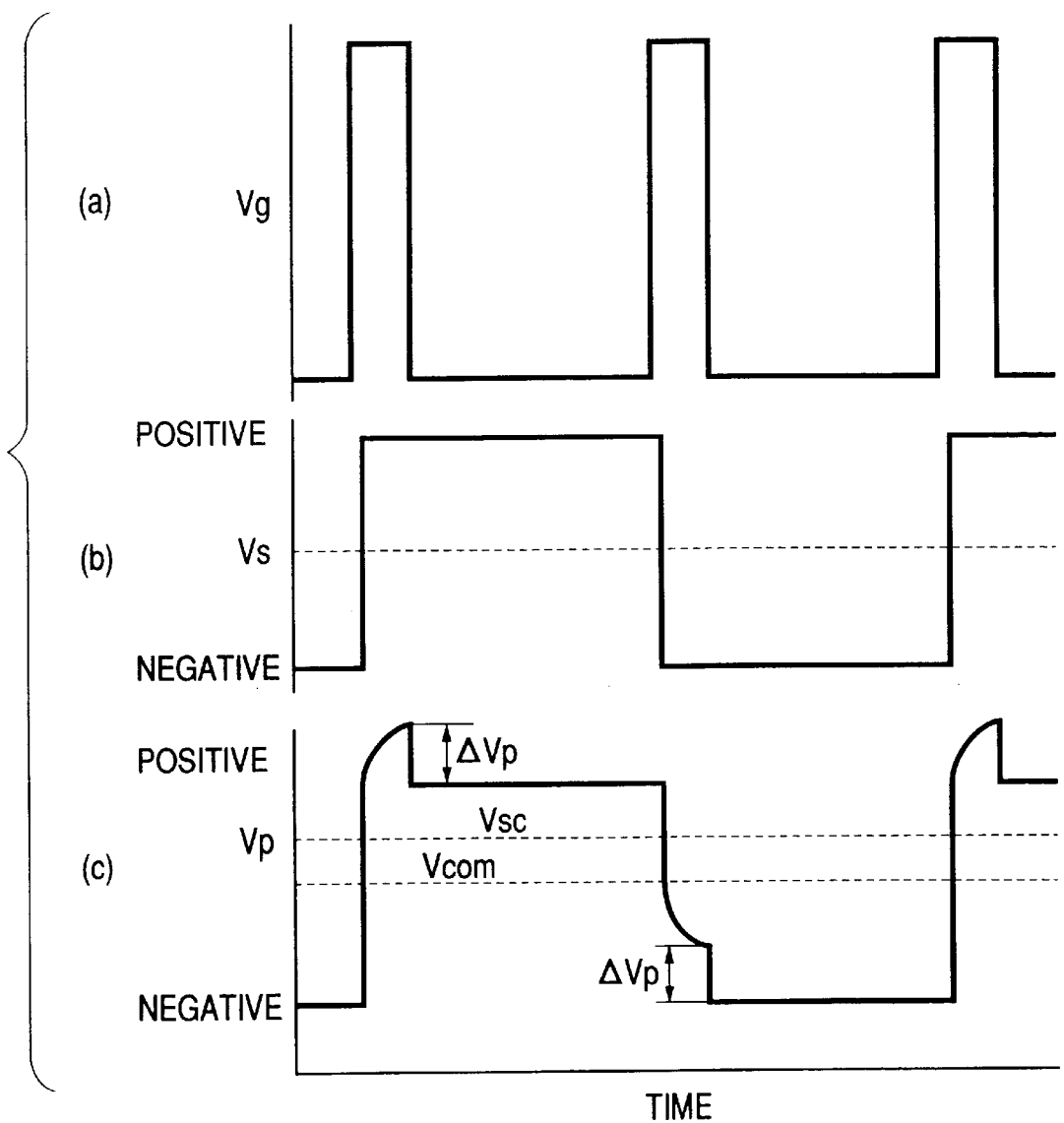
FIG. 4 is a schematic view showing driving voltage in the liquid crystal display of FIG. 7.

The TFT is, as shown in FIGS. 2 and 3, formed by providing a gate electrode 2 provided by bringing out of the scanning lines 1, providing, on top thereof, gate insulating film 3 made of silicon nitride, providing, on top thereof, semiconductor film 4 made of amorphous silicon, further providing, on top thereof, ohmic film 5 made of n+ type amorphous silicon obtained by adding phosphorus to the amorphous silicon, and by providing, on top thereof, a drain electrode 7 and a source electrode 8 which are made of conductive material. Of these, the source electrode 8 is provided by bringing out of the signal lines 19. Further on top thereof, passivation film 10 made of silicon nitride is provided so as to cover these, the passivation film 10 on the drain electrode 7 is formed with a contact hole 18a, and thereafter, there is provided a transparent pixel electrode 11 made of indium tin oxide so as to connect through the drain electrode 7 and the contact hole 18a.

Storage capacity is formed with the scanning lines 1 as one electrode, with the gate insulating film 3 on top thereof as dielectric, and further on top thereof, with a capacity electrode 9 of storage capacity made of conductive material of the same layer as the drain electrode 7 and the source electrode 8 as the other electrode. On top of the capacity electrode 9, passivation film 10 is formed as in the case of the TFT. In this passivation film 10, after a contact hole 18b is formed, the pixel electrode 11 is provided by bringing it out above the capacity electrode 9, and the capacity electrode 9 and the pixel electrode 11 are connected through the contact hole 18b. In this respect, the storage capacity is in parallel connection with the above-described liquid crystal capacity, and both become load capacity of the TFT.

According to the present embodiment, two pixel areas having size of 40 μm in width×120 μm in length and size of 40 μm in width×400 μm in length respectively are formed on the same TFT array substrate 40. Of these, as regards the pixel area 33 of the sub-display area 31 having size of 40 μm×400 μm, which is larger in pixel area size, the design has been made such that, as shown in FIGS. 2 and 3, minimum space Db between the scanning line 1 and the pixel electrode 11 is larger than maximum space d between the substrate 16 and the opposite substrate 17, which are oppositely arranged, and that the minimum space Db becomes smaller than a value obtained by deducting length of the pixel electrode 211 (see FIG. 7) of the main display area 30 in a direction perpendicular to scanning lines 201 in the main display area 30 from length of the pixel electrode 11 of the sub-display area 31 in a direction perpendicular to the scanning lines 1 in the sub-display area 31. More concretely, the design was made such that the space between the scanning lines 1 and the pixel electrode 11 becomes 8 μm while the space between these substrates oppositely arranged is 4 μm. This enables reducing the parasitic capacity between the scanning lines 1 and the pixel electrode 11.

Figure 7:
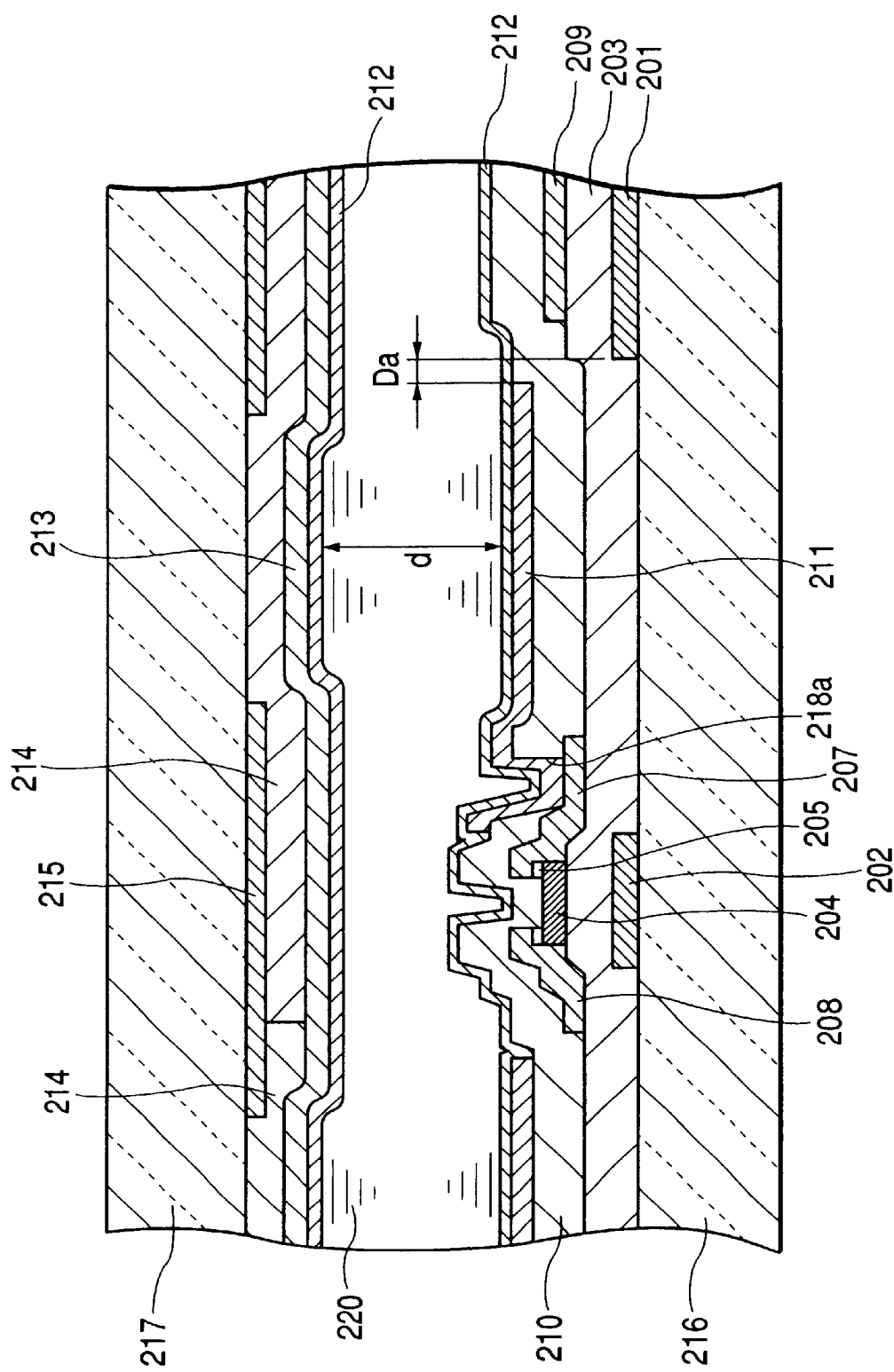
FIG. 7 is a sectional view showing a pixel area shown in FIG. 8.
Figure 8:
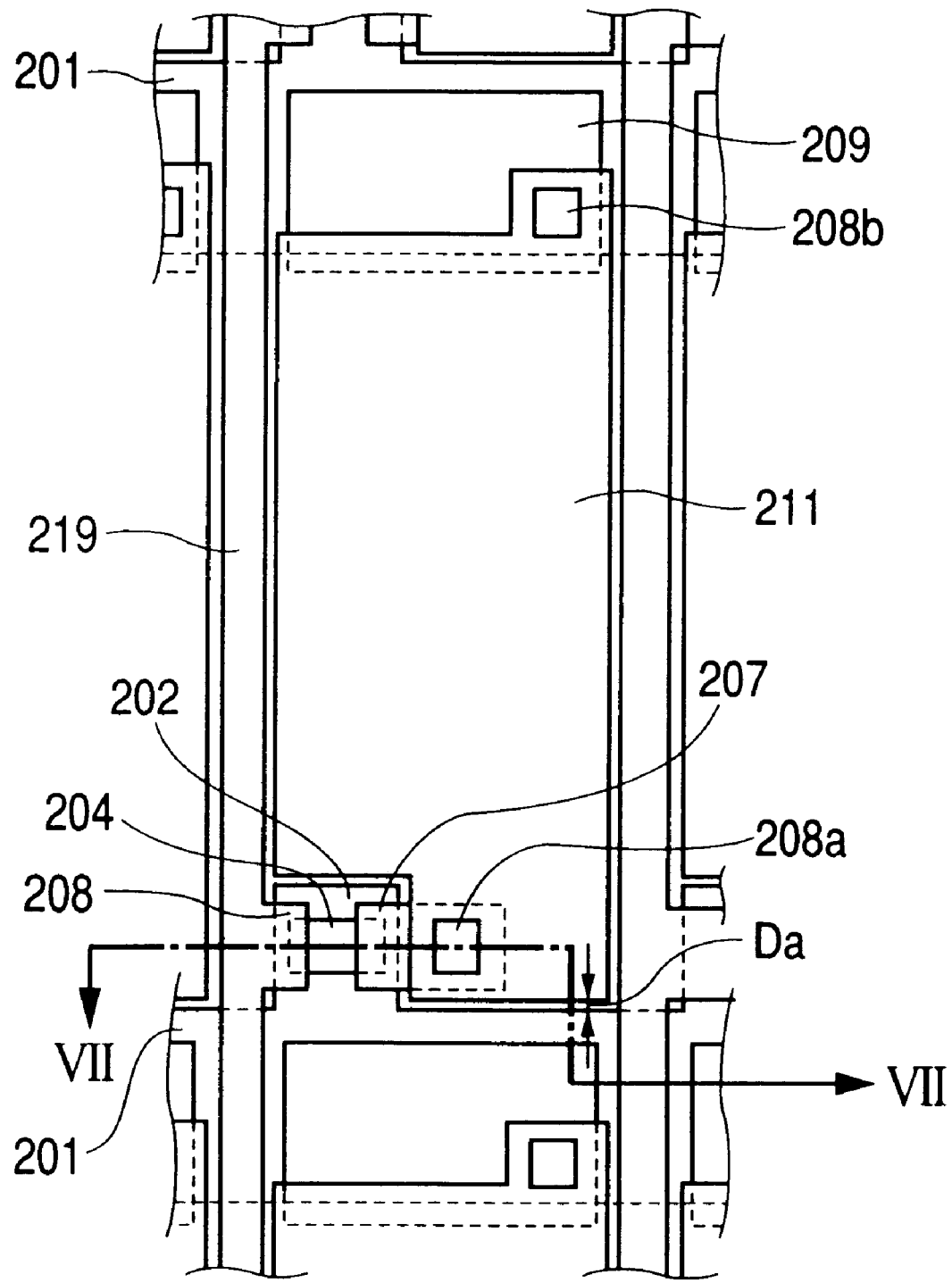
FIG. 8 is a plan view showing a pixel area of the main display area of the TFT array substrate shown in FIG. 1.

With reference to FIGS. 7 and 8, the detailed description will be made of the pixel area 32 of the main display area 30 shown in FIG. 1. On the pixel area 32, in addition to scanning lines 201 and signal lines 219 formed in a lattice shape, there are formed: TFT consisting of a gate electrode 202 brought out from the scanning lines 201, a semiconductor layer 204, and a source electrode 208 and a drain electrode 207 brought out from the signal lines 219; a pixel electrode 211 connected to the drain electrode 207 of this TFT through the contact hole 218a; and storage capacity having a capacity electrode 209 formed in the same layer as signal lines 219 and the scanning lines 201 as opposite electrodes.

Next, using the equations, the description will be made of the effect. A voltage drop ΔVp at potential of the pixel electrode 211 can be expressed by the following equation:

$$\Delta Vp = (Vgh \times (Cgdon + Cgp) - Vgl \times (Cgdoff + Cgp) - Vs \times (Cgdon - Cgdoff))/(Cs + Clc + Cgdoff + Cgp)$$

ΔVp: Voltage drop at potential of pixel electrode
Vgh: High potential of gate voltage
Cgdon: Parasitic capacity when TFT is ON
Cgp: Line capacity between scanning line and pixel electrode
Vgl: Low potential of gate voltage
Cgdoff: Parasitic capacity when TFT is OFF
Vs: Potential of signal voltage
Cs: Storage capacity
Clc: Capacity of liquid crystal layer In contrast, when design is made with Cgp as a negligible level as compared with Cgd by reducing Cgp, this equation can be represented by the following equation:

$$\Delta Vp = (Vgh \times Cgdon - Vgl \times Cgdoff - Vs \times (Cgdon - Cgdoff))/(Cs + Clc + Cgdoff)$$

A ratio of the minimum space Db between the pixel electrode 11, the scanning line 1 and the gate electrode 2 in the sub-display area 31, to the maximum space d between the opposite surfaces of the substrate is set to one or more so as to be able to ignore Cgp, which is a design parameter of $\Delta Vp$ as described above, whereby a design equation for $\Delta Vp$ can be simplified. For this reason, by adjusting values of Cgdon and Cgdoff which depend upon dimensions of Cs, channel length and channel width of the TFT, it becomes easy to design $\Delta Vp$ in the main display area 30 and the sub-display area 31 to be equal to each other.

Figure 5:
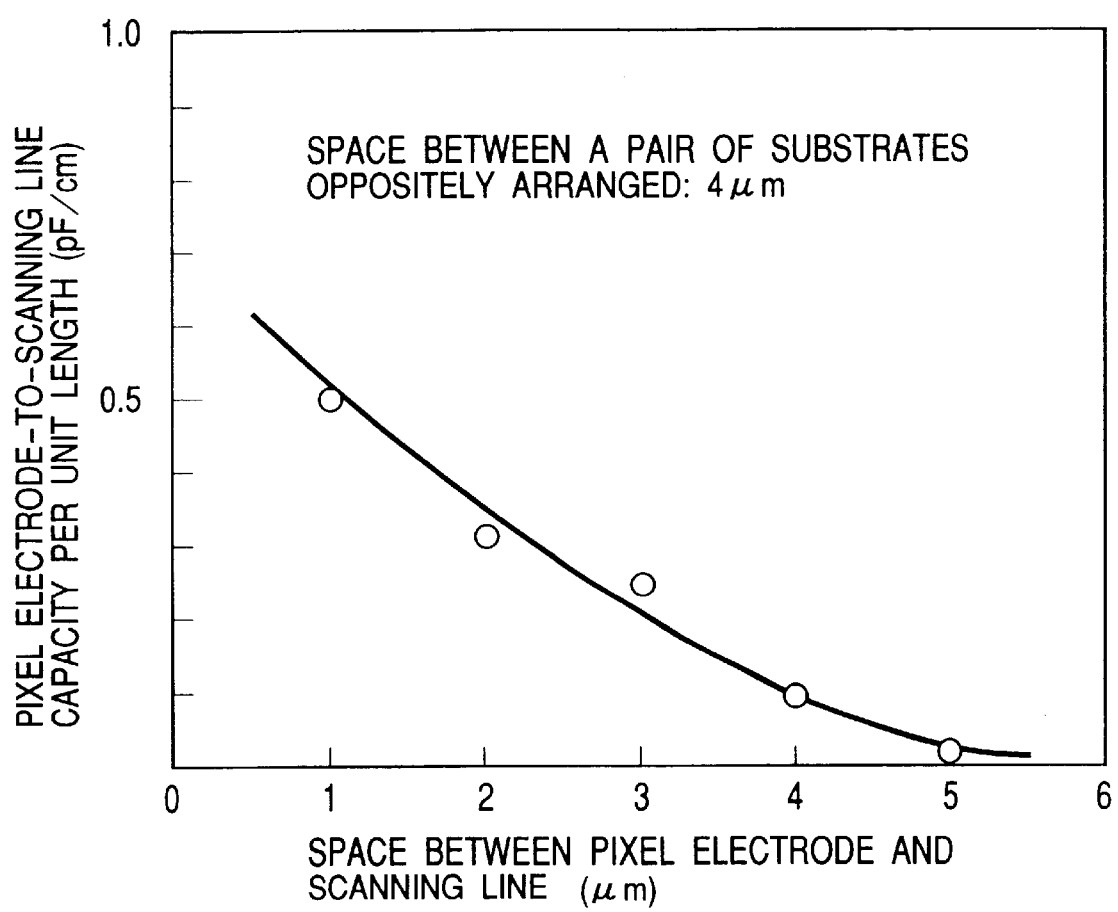
FIG. 5 shows an actually measured result showing relationship between space between pixel electrode and scanning line of the TFT array substrate, and the capacity thereof.

FIG. 5 is a view showing relationship between space between the scanning line 1 and the pixel electrode 11, and parasitic capacity between the scanning line 1 and the pixel electrode 11 when the maximum space between opposite surfaces of the pair of substrates 16 and 17 oppositely arranged is, in the present embodiment shown in FIG. 3, set to 4 µm. Although the parasitic capacity of the TFT is 10 PF according to the present embodiment, it can be seen according to the result of FIG. 5 that if the maximum space between opposite surfaces of the pair of substrates 16 and 17 oppositely arranged is set to 4 µm, the parasitic capacity between the scanning line 1 and the pixel electrode 11 can be converted to about 0.4 PF since the pixel area has size of 40 µm in width, and can be set to ¹⁄₁₀ or less as compared with the TFT's parasitic capacity. For this reason, in the present embodiment, the minimum space between the scanning lines 1 and the pixel electrode 11 has been designed to be 8 µm allowing for sufficient room. According to the result of FIG. 5, it can be seen that the parasitic capacity could be ignored if there is provided the space of 4 µm or more, which is the maximum space between opposite surfaces of the pair of substrates 16 and 17 oppositely arranged, or more. This can be easily understood because a line of electric force extending from the scanning lines given with electric potential is terminated toward an electrode located at a minimum distance therefrom, and capacity is formed by charge to be appeared at both ends of the line of electric force.

With reference to the drawings, the description will be made of a second embodiment according to the present invention.

Figure 9:
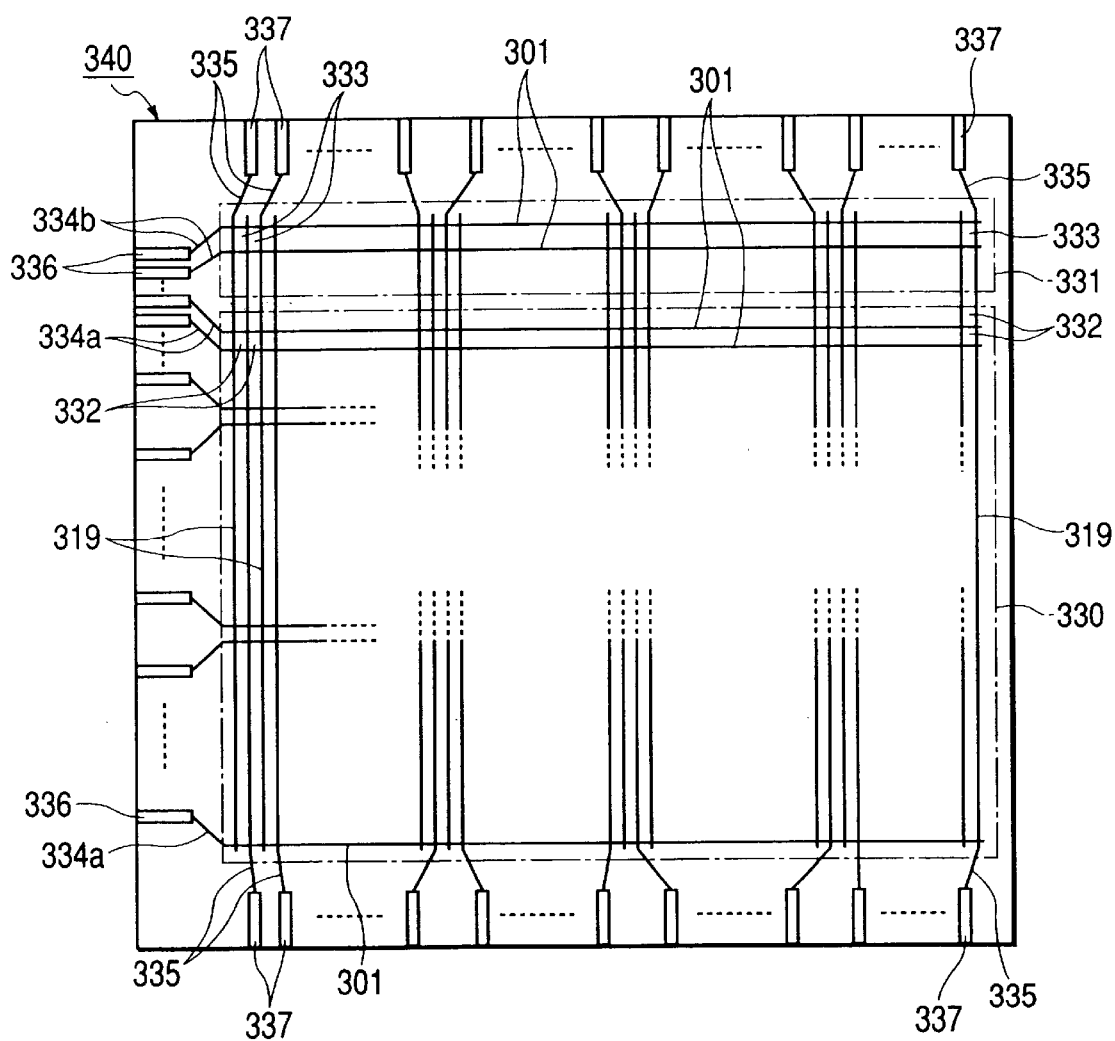
FIG. 9 is a plan view showing a TFT array substrate according to a second embodiment of the present invention.

FIG. 9 is a plan view showing a TFT array substrate 340 in an active matrix type liquid crystal display according to the second embodiment of the present invention.

In the second embodiment of the present invention, on a TFT array substrate 340, a multiplicity of pixel areas 332 and 333 are arranged in a matrix shape on a main display area 330 and a sub-display area 331 respectively. The pixel area is an area enclosed with scanning lines 301 and signal lines 319, and pixel areas located in the main display area 330 and the sub-display area 331 are different in size.

More concretely, the pixel area 332 in the main display area 330 has size of 40 µm in width×120 µm in length, and the pixel area 333 in the sub-display area 331 has size of 40 µm in width×400 µm in length.

In the present embodiment, the sub-display area 331 consisting of pixel areas 333, each of which is larger in size than each of the pixel areas 332 in the main display area 330, is formed in the upper part of the main display area 330 such that the widths of the pixel areas coincide with each other in a scanning line direction.

Scanning lines 301 for scanning these pixel areas and signal lines 319 for supplying signals are formed in a lattice shape. The signal lines 319 are not discontinued between the main display area 330 and the sub-display area 331 which are different from each other in size of pixel area, but are continuously wired.

All around the main display area 330 and the sub-display area 331, there are respectively formed: leader wiring 334a and 334b of the scanning lines brought out from the scanning lines 301 of each display area 330, 331 to terminals 336 of the scanning lines for connecting to an external gate driver (not shown); and leader wiring 335 of the signal lines brought out from the signal lines 319 of each display area 330, 331 to terminals 337 of the signal lines for connecting to an external source driver (not shown). In this respect, as a case different from the present embodiment, there are some cases where a driving circuit is incorporated on the same TFT array substrate, and in this case, the leader wiring from the scanning lines and the leader wiring from the signal lines may be brought out to the output from this driving circuit.

Figure 10:
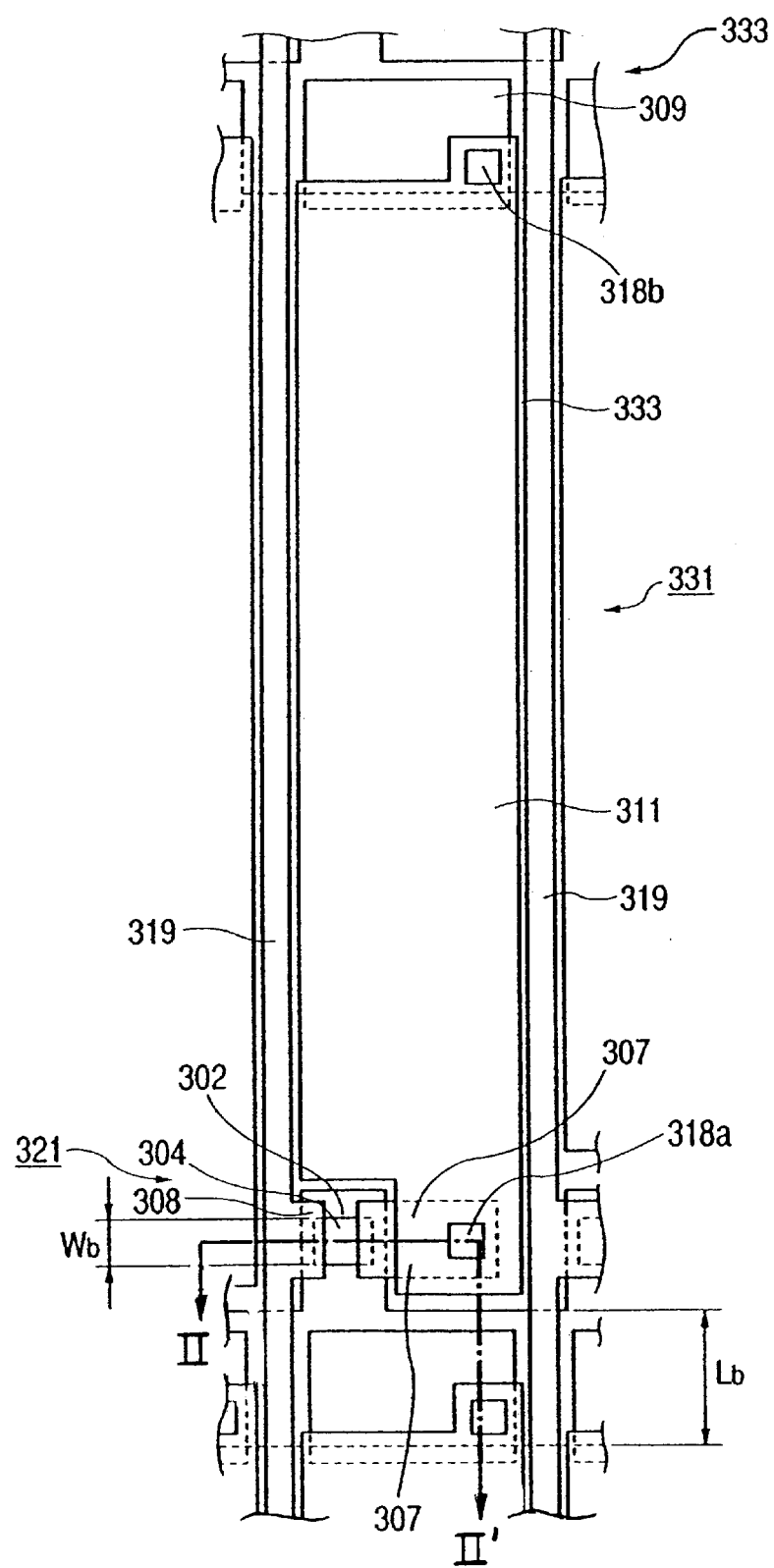
FIG. 10 is an enlarged plan view for the neighborhood of a pixel area in the sub-display area of the TFT array substrate shown in FIG. 9.
Figure 11:
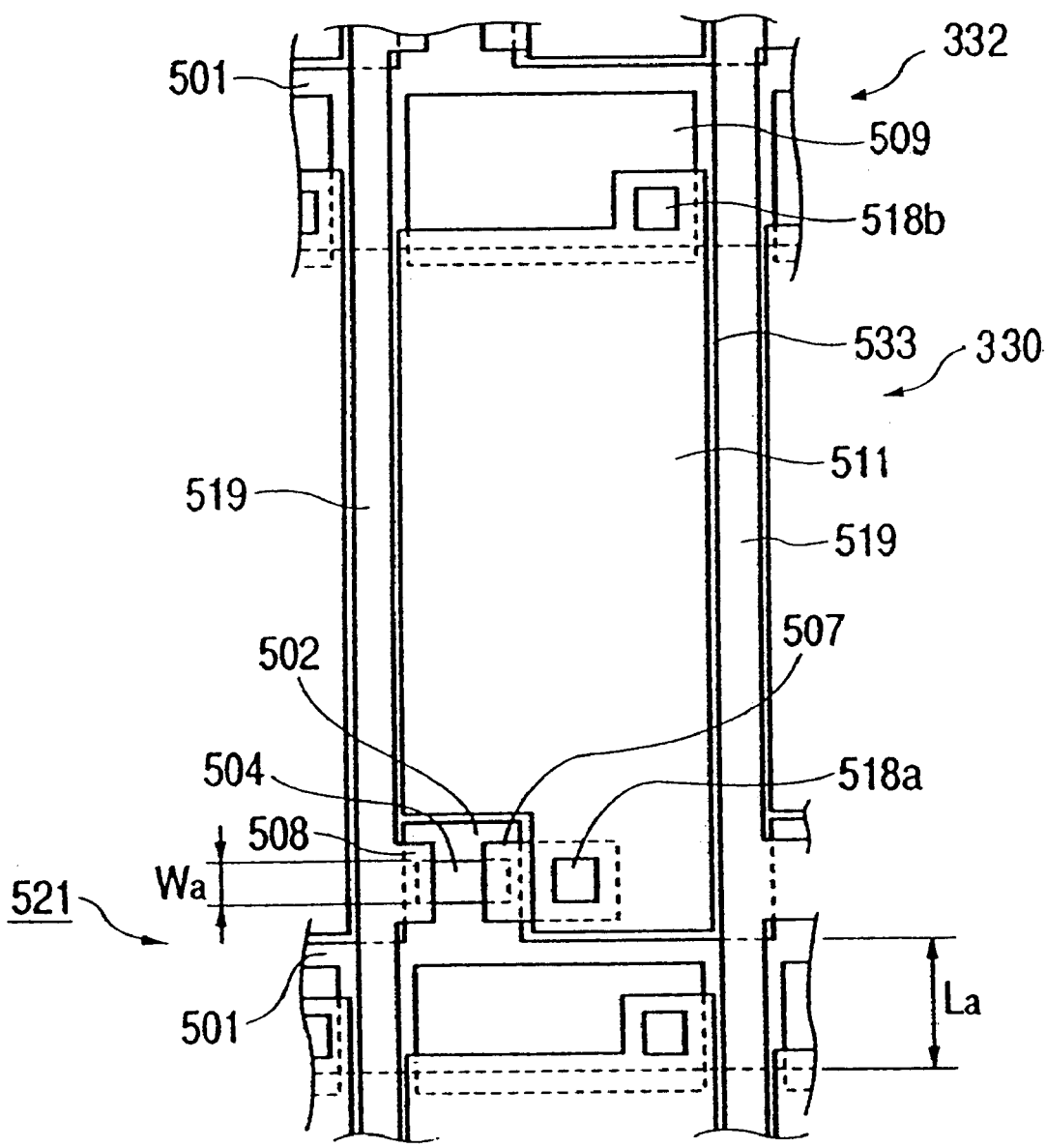
FIG. 11 is an enlarged plan view for the neighborhood of a pixel area in the main display area of the TFT array substrate shown in FIG. 9.
Figure 12:
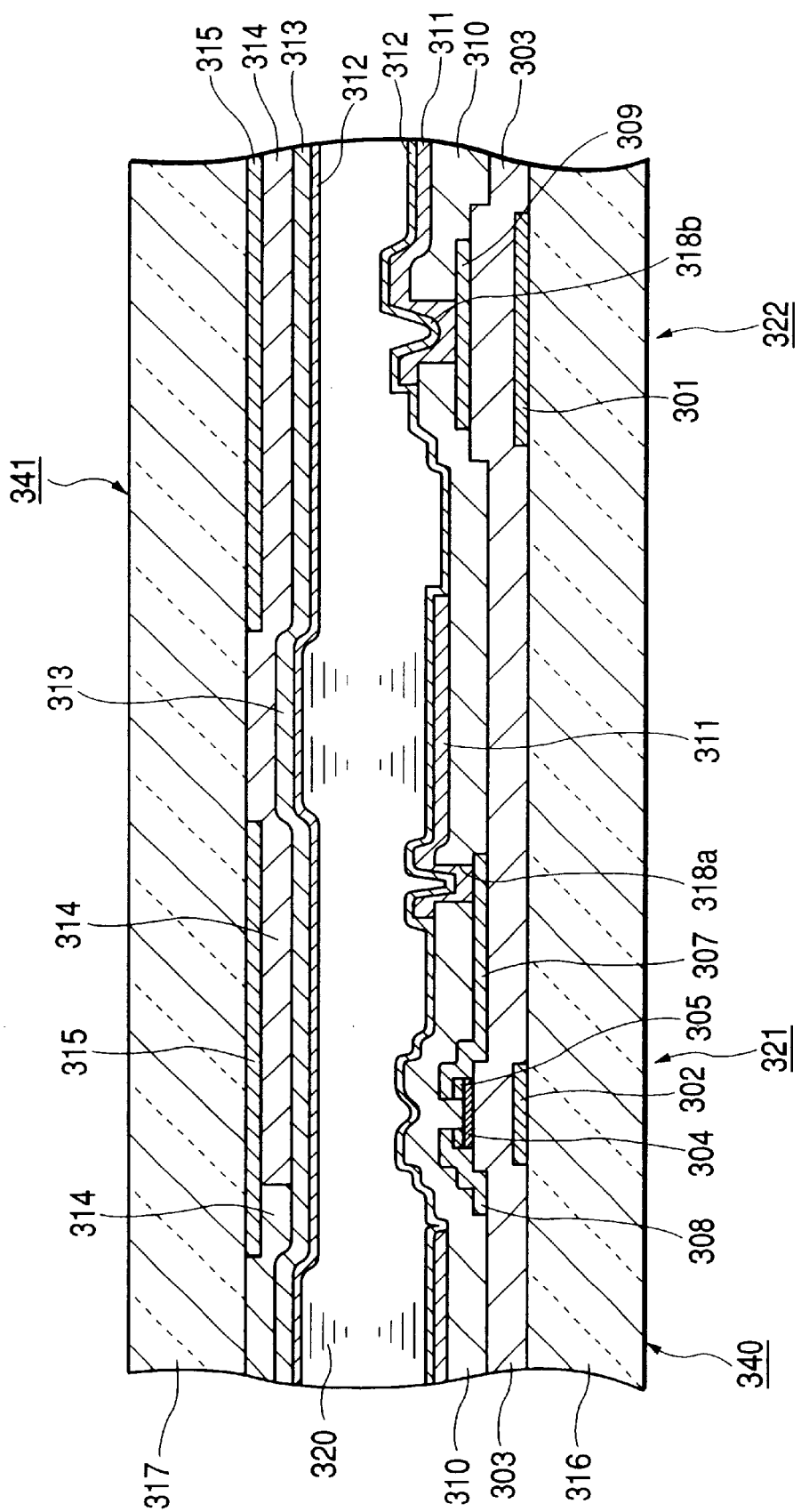
FIG. 12 is a sectional view taken on line A-A' of FIG. 10.

FIG. 10 is an enlarged plan view for one pixel area 333 in the sub-display area 331 of the liquid crystal display according to the present embodiment. FIG. 11 is an enlarged plan view for one pixel area 332 in the main display area 330. FIG. 12 is a sectional view taken on line II–II' which penetrates the TFT, contact hole and capacity electrode of FIG. 10. In this respect, the pixel area 332 of the main display area 330 is also different only in size of pixel area, channel width of TFT and dimension of storage capacity, and has the same structure as the pixel area 333 of the sub-display area 331.

As shown in FIG. 10, the pixel area 333 in the sub-display area 331 is enclosed with scanning lines and signal lines, and in the lower left of the plane, TFT 321 is formed, and in the upper portion of the plane, storage capacity 322 is formed. In the central portion thereof, a pixel electrode 311 is arranged.

When viewing in three dimensions, the liquid crystal display using the TFT array substrate 340 has, as shown in FIG. 12, an opposite substrate 341 arranged to oppose to the TFT array substrate 340 through a liquid crystal layer 320. The opposite substrate 341 is provided with a light-shielding black matrix 315, a color filter 314, and a transparent opposite electrode 313 made of indium tin oxide (hereinafter, abbreviated as ITO) similar to an pixel electrode 311. On a surface in contact with the liquid crystal, orientation film 312 is formed. Therefore, when voltage is applied between the pixel electrode 311 and the opposite electrode 313, it is arranged such that an electric field is applied to the liquid crystal layer 320, and that orientation control of liquid crystal molecules can be performed. This structure can be regarded as capacity (hereinafter, referred to as liquid crystal capacity) because it has the pixel electrode 311 and the opposite electrode 313 respectively as electrode, and has a liquid crystal layer 320, which is dielectric, therebetween.

The TFT is, as shown in FIGS. 10 and 12, formed by providing a gate electrode 302 provided by bringing out from the scanning lines 301, providing, on top thereof, gate insulating film 303 made of silicon nitride, providing, on top thereof, semiconductor film 304 made of amorphous silicon, further providing, on top thereof, ohmic contact film 305 made of n+ type amorphous silicon obtained by adding phosphorus to the amorphous silicon, and providing, on top thereof, a drain electrode 307 and a source electrode 308 which are made of conductive material. Of these, the source electrode 308 is provided by bringing out from the signal lines 319. Further on top of the drain electrode 307 and the source electrode 308, passivation film 310 made of silicon nitride is provided so as to cover these, the passivation film 310 on the drain electrode 307 is formed with a contact hole 318a. The drain electrode 307 and a transparent pixel electrode 311 made of ITO are connected together through the contact hole 318a.

Storage capacity 322 is formed with the scanning lines 301 as one electrode and with the gate insulating film 303 on top thereof as dielectric, and further on top thereof, a capacity electrode 309 serving as the other electrode is formed. The capacity electrode 309 is formed by the same conductive material as the drain electrode 307 and the source electrode 308. On top of the capacity electrode 309, passivation film 310 is formed as in the case of the TFT 321. On this passivation film 310, a contact hole 318b is formed, a pixel electrode 311 made of ITO is provided by bringing it out on the capacity electrode 309, and the capacity electrode 309 and the pixel electrode 311 are connected together through the contact hole 318b. In this respect, the storage capacity 322 is in parallel connection with the above-described liquid crystal capacity, and both become load capacity of the TFT 321.

In the present embodiment, the pixel area 332 in the main display area 330 has size of 40 $\mu$m in width×120 $\mu$m in length, and the pixel area 333 in the sub-display area 331 has size of 40 $\mu$m in width×400 $\mu$m in length. The pixel area 332 in the main display area 330 is smaller, and the pixel area 333 in the sub-display area 331 is larger. Therefore, in order to make the voltage drop $\Delta Vp$ in each pixel electrode equal to each other, the parasitic capacity Cgd of the TFT in the sub-display area 331 can be made larger or the storage capacity Cs can be made smaller by making the parasitic capacity Cgdon of the TFT in the main display area 330 smaller or making the storage capacity Cs larger as described above.

The parasitic capacity Cgd of the TFT is determined by the area of a portion where the gate electrode, the semiconductor film (channel) and the drain electrode of the TFT overlap one another. To shorten the channel length is restrained by the design rule, and to lengthen the channel length deteriorates the current driving capacity of the TFT, and therefore, they are not advisable. Accordingly, the channel width will be adjusted. In FIGS. 10 and 11, the width Wa, Wb of the semiconductor film 304 is the channel width. In the main display area 330 having a smaller pixel area, the channel width is made narrower, and conversely, in the sub-display area 331 having a larger pixel area, the channel width is made wider.

More concretely, in the present embodiment, the channel length is set to 3 $\mu$m, and the channel width in the main display area is set to 5 $\mu$m, and the channel width in the sub-display area is set to 29 $\mu$m.

Referring to FIGS. 9, 10, and 11, the storage capacity Cs is determined by areas for storage electrodes 309 and 509 formed on scanning lines 301 and 501. Length of the storage electrodes 309 and 509 is determined by size of the pixel because the storage electrodes 309 and 509 are enclosed with signal lines 319 and 519 respectively. Therefore, the area is adjusted by changing the width of the storage electrode 309 or 509. The storage capacity Cs also changes in proportion to the area.

More concretely, in the present embodiment, the storage capacity for the main display area is set to 216 PF, and the storage capacity for the sub-display area is set to 523 PF.

Next, the description will be made of a method for changing wiring resistance Rg of the scanning lines. The wiring resistance of the scanning lines includes wiring resistance of the scanning lines themselves within the display area, and wiring resistance of leader wiring of the scanning lines in the panel portion outside the display area. In the present embodiment, the size of the pixel area is smaller in the main display area, and is larger in the sub-display area. Accordingly, the capacity of the liquid crystal layer is also smaller in the main display area, and is larger in the sub-display area. Therefore, since the capacity Cg of the scanning lines becomes smaller in the main display area, and is larger in the sub-display area from the above-described equation (3), delay time of the scanning signal also becomes smaller in the main display area, and is larger in the sub-display area. In such a case, in order to make the delay time T constant, the wiring resistance Rg of the scanning lines can be made larger in the main display area, and conversely smaller in the sub-display area from the equation (2).

In order to make the wiring resistance Rg of the scanning lines larger in the main display area and smaller in the sub-display area, there are several methods. As the wiring resistance Rg of the scanning lines, there are resistance of the scanning lines within the display area shown in FIG. 9, and resistance of leader wiring for connecting from the display area to the terminal of the scanning lines for connecting to the gate driver (not shown). These wiring resistances can be made larger in the main display area and smaller in the sub-display area.

In order to change the resistance of the scanning lines within the display area, the width of the scanning lines is changed assuming the thickness of the wiring to be constant because the length of the scanning lines is determined by the size of the display area. In other words, the width of the scanning line within the display area can be made narrower in the main display area and wider in the sub-display area.

More concretely, in the present embodiment, in FIGS. 10 and 11, the width La of the scanning lines 501 in the main display area is 31 $\mu$m, whereas the width Lb of the scanning lines 1 in the sub-display area is set to 86 $\mu$m. This enables signal delay time in the scanning lines in the main and sub-display areas to become equal to each other.

Next, description will be made of a method for adjusting the resistance of leader wiring for connecting from the display area to the terminals of the scanning lines for connecting to the gate driver (not shown). In this case, the wiring resistance of the larger pixel area side is made smaller as described above.

Scanning line terminals are, as shown in FIG. 9, provided in space in the panel portion of the liquid crystal display. Therefore, some degree of freedom is left in design for leader wiring from the display area to the terminals within a range of the space in the panel portion. In order to adjust the wiring resistance, means for changing the length or width of the wiring can be adopted. If the wiring length is made longer, the wiring resistance Rg becomes higher, and the wiring resistance Rg can become higher even by making the wiring width narrower. The wiring resistance Rg can be adjusted by changing at least one or both of the length and width of the wiring. If the width is made narrower, the wiring resistance becomes higher, and if the length is made longer, the wiring resistance becomes higher. Therefore, the width and length can be adjusted in consideration of the space in the panel portion.

More concretely, in the present embodiment, in FIG. 9, the width and length of the leader wiring 334a of the main display area are set to 15 $\mu$m and 4 mm respectively, and the width and length of the leader wiring 334b of the sub-display area are set to 30 $\mu$m and 3 mm respectively. This enables signal delay time in the scanning lines in the main and sub-display areas to become equal to each other.

Next, the description will be made of a method for changing the capacity Cg of the scanning lines, which is another means for making the signal delay time equal to each other.

Figure 6:
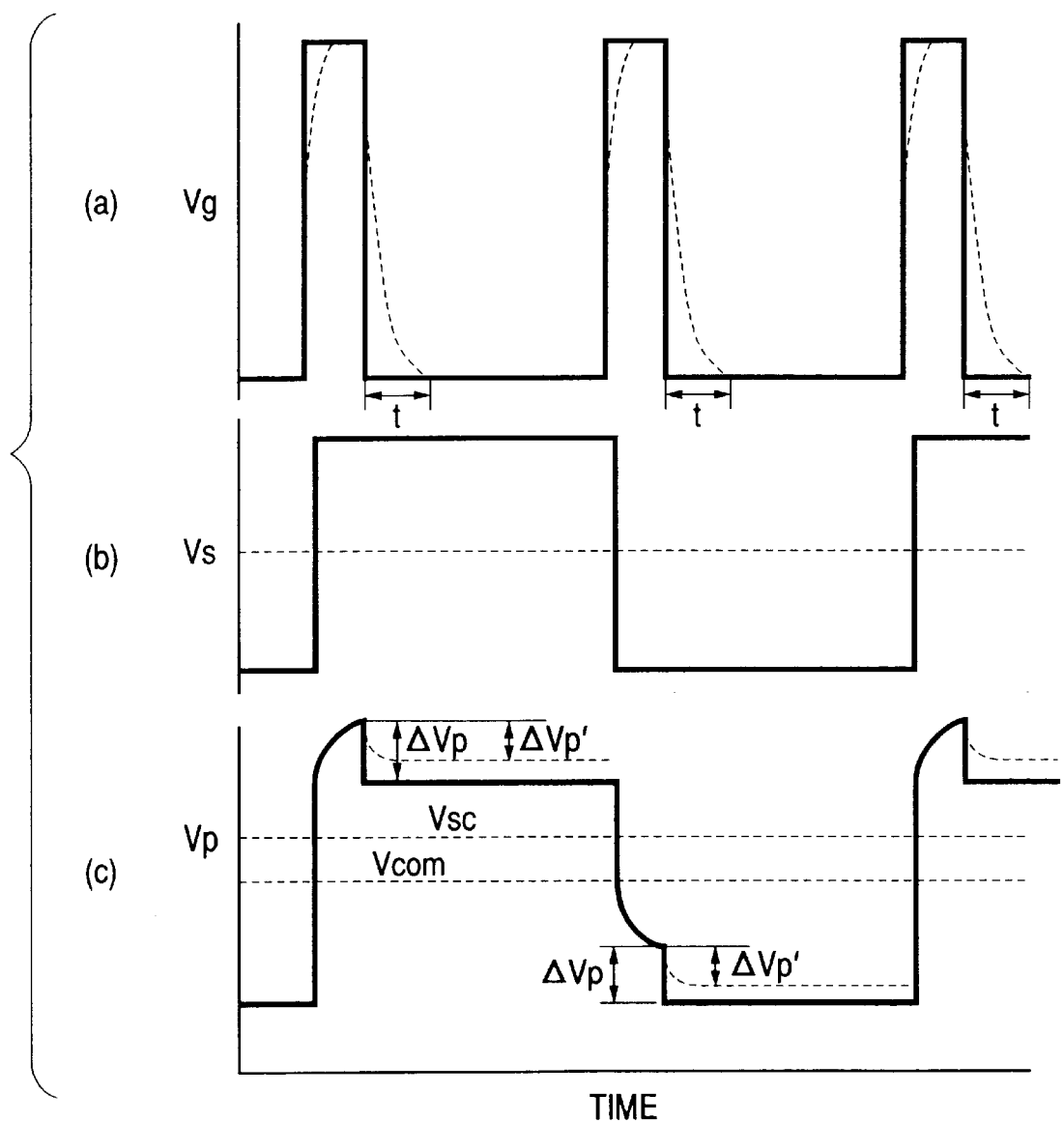
FIG. 6 is a view for explaining conventional delay in a driving voltage signal in the liquid crystal display.
Figure 13:
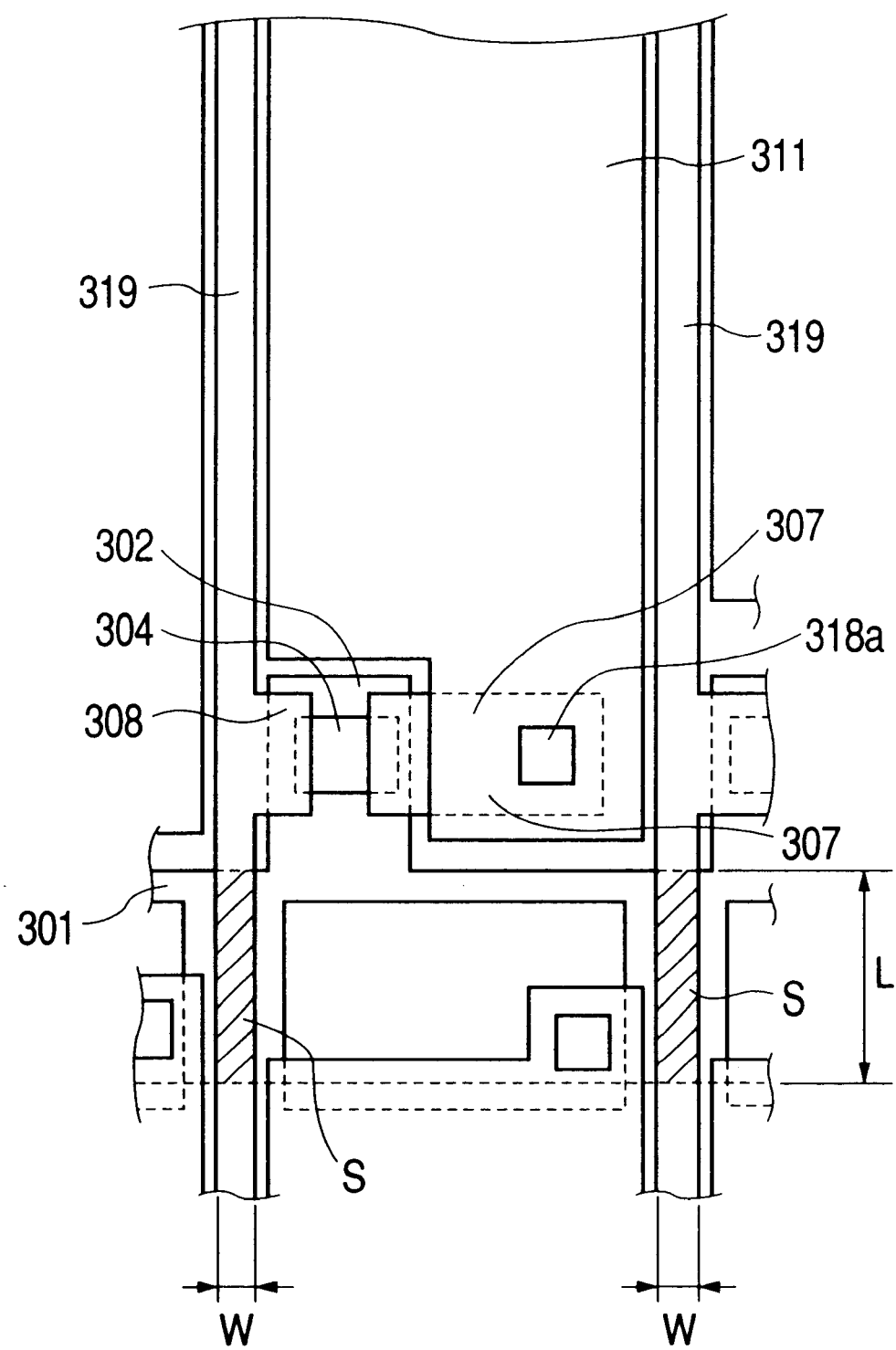
FIG. 13 is an enlarged plan view for the neighborhood of the TFT in the TFT array substrate shown in FIG. 9.
Figure 14:
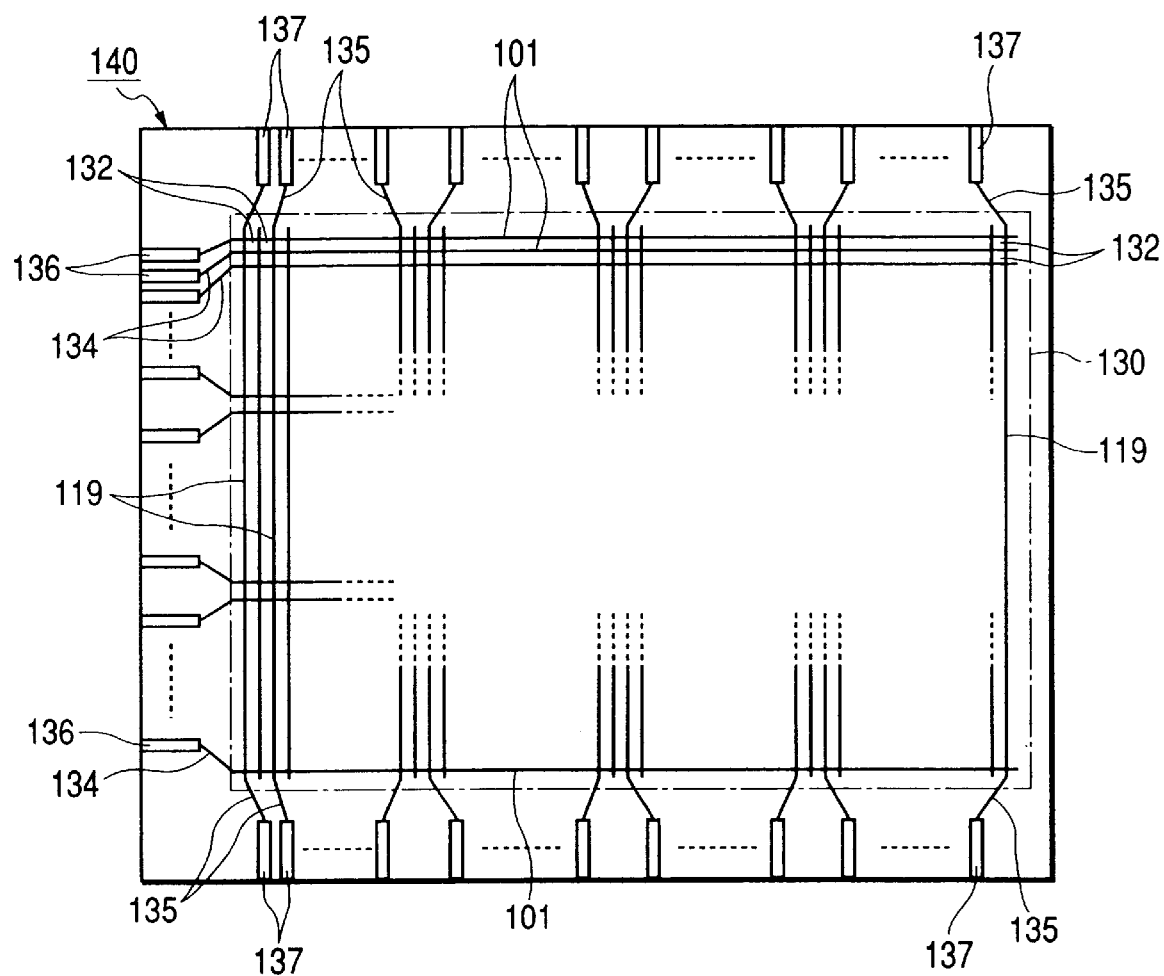
FIG. 14 is a plan view showing a conventional TFT array substrate.

According to the structure of the liquid crystal display of the present invention, scanning lines 301 and signal lines 319 are constituted so as to surround the pixel electrode 311 in the sub-display area 331 as shown in FIG. 13. In the neighborhood of the TFT, the scanning lines 301 and the signal lines 319 intersect each other. Since the scanning lines 301 and the signal lines 319 overlap each other through insulating film in this intersected portion, wiring capacity Cx is to be formed. From the scanning line 301, there is brought out a gate electrode 302, on top of which there are provided a TFT and storage capacity, and the storage capacity is connected to a neighboring pixel electrode 311. Therefore, the capacity is to constitute series capacity on top of the scanning lines 301. In this case, when the size of the pixel area is changed, the liquid crystal layer capacity is also changed, and the above-described series capacity is also changed. Therefore, for each size of the pixel area, the signal delay becomes different in accordance with the equation (2), and the magnitude of voltage drop ΔVp' in the pixel electrode of FIG. 6(c) also becomes different.

As described above, the wiring capacity Cg of the scanning lines is given by equation (3). In this case, in order to make the parallel capacity unchanged even if the size of the pixel area may be changed, it can be realized by changing an area of a portion where the scanning lines 301 and the signal lines 319 which constitute the parallel capacity overlap each other, that is, the capacity as one means. The scanning lines 301 are wired so as to place the pixel areas in a row within each display area, and the signal lines 319 are continuously wired throughout the main and sub-display areas. However, by changing the wiring width only in a portion where the scanning lines 301 and the signal lines 319 overlap each other without changing the wiring width in the main portion, it is possible to change the area of the portion where the scanning lines 301 and the signal lines 319 overlap each other. Since it is possible to make the signal delay time in the scanning lines equal to each other even if the main and sub-display areas may be different in size of the pixel electrode for the above reason, it becomes possible to maintain the voltage drop ΔVp' equal to each other.

An area S of the portion where the scanning lines 301 and the signal lines 319 overlap each other is an area of the portion indicated by hatching in FIG. 13, represented by width W and L. Therefore, the area S can be changed by changing the width W of the signal lines or the width L of the scanning lines in the intersected portion. Or, the area S of the overlapped portion can be changed by changing both the width W and L.

As described above, in the main display area 330, the pixel area is small in size, and the capacity Clc of the liquid crystal layer is small. Therefore, in order to make Cg constant in the equation (3), the area of the overlapped portion of the scanning lines 301 and signal lines 319 can be made smaller to make Cx smaller.

More concretely, according to the present embodiment, in the main display area 330, the width L of the scanning lines 301 is set to 31 μm, the width W of the signal lines 319 is set to 3 μm, that is, the area Sa of the overlapped portion is set to 93 μm$^2$, and in the sub-display area 331, the width L of the scanning lines 1 is set to 86 μm, the width W of the signal lines 319 is set to 3 μm, that is, the area Sb of the overlapped portion is set to 258 m$^2$. This enables the signal delay time in the scanning lines between the main and sub-display areas to become equal to each other, and flickers can be restricted.

As described above, an active matrix type liquid crystal display according to the present invention is capable of preventing flickers and sticking by applying optimum opposite substrate potential to one opposite electrode without dividing an opposite electrode to apply optimum DC voltage to the respective ones.

Also, another active matrix type liquid crystal display according to the present invention is capable of making delay time of a gate signal equal to each other between the main and sub-display areas having different pixel areas in size respectively, and making voltage drop ΔVp of the pixel electrode equal to each other. As a result, it is possible to prevent flickers and sticking in a simple structure without dividing the opposite electrode and without changing the opposite electrode voltage, and to obtain excellent quality display images.

What is claimed is:

1. An active matrix type liquid crystal display wherein there is sandwiched a liquid crystal layer between a pair of substrates oppositely arranged; on the surface of one of the substrates, a plurality of scanning lines and a plurality of signal lines are formed to intersect one another in a matrix shape; in the vicinity of a plurality of intersected portions formed by the plurality of scanning lines and signal lines, there are formed respectively thin film transistors (hereinafter, referred to as TFTs) having gate electrodes connected to the scanning lines, pixel electrodes connected to the TFTs, and capacity electrodes for forming storage capacity with the scanning lines; on the surface of the other substrate on the liquid crystal layer side, there is formed an opposite electrode; there are provided a main display area having a plurality of pixel areas, each of the pixel areas being enclosed with the scanning lines and the signal lines and being equal to one another in size, and a sub-display area having pixel areas different, in size, from the pixel areas in the main display area having the plurality of pixel areas; and a ratio of a minimum space to a maximum space is equal to or greater than one, wherein the minimum space is comprised of a first distance that separates nearest ends of one pixel electrode and one scanning line and the maximum space comprises a second distance between opposite surfaces of the paired substrates.

2. An active matrix type liquid crystal display according to claim 1 wherein maximum space between each pixel electrode, the scanning line for driving it and the gate electrode in the sub-display area is set to a smaller value than a value obtained by deducting length of the pixel electrode in the main display area in a direction perpendicular to the scanning line thereof from length of the pixel electrode in the sub-display area in a direction perpendicular to the scanning line thereof.

3. An active matrix type liquid crystal display wherein there is sandwiched a liquid crystal layer between a pair of substrates oppositely arranged; on the surface of one of the substrates, a plurality of scanning lines and a plurality of signal lines are formed to intersect each other in a matrix shape; in the vicinity of a plurality of intersected portions formed by the plurality of scanning lines and signal lines, there are formed respectively TFTs having gate electrodes connected to the scanning lines, pixel electrodes connected to the TFTs through drain electrodes, and storage capacity; there are provided a main display area and a sub-display area which have pixel areas different from each other in size respectively, each of the pixel areas being enclosed with the scanning lines and the signal lines; all around each display area, there are formed leader wiring for the scanning lines and leader wiring for the signal lines; on the surface of the other substrate on the liquid crystal layer side, there is formed an opposite electrode; and a first structure in which wiring resistance of the scanning lines in the main display area is different from wiring resistance of the scanning lines in the sub-display area, a second structure in which an area of a portion where the scanning lines and the signal lines overlap in the main display area is different from an area of a portion where the scanning lines and the signal lines overlap in the sub-display area,

- a third structure in which a channel width of TFT in the main display area is different from a channel width of TFT in the sub-display area, and
- a fourth structure in which storage capacity of the main display area is different from storage capacity of the sub-display area,
- the active matrix type liquid crystal display having any one structure.

4. An active matrix type liquid crystal display according to claim 3 wherein a width of the scanning line in the main display area is different from a width of the scanning line in the sub-display area.

5. An active matrix type liquid crystal display according to claim 3 wherein the pixel area in the main display area is smaller in size than the pixel area in the sub-display area.

6. An active matrix type liquid crystal display according to claim 5 wherein the pixel area in the main display area is smaller in size than the pixel area in the sub-display area and the scanning line in the main display area is narrower in width than the scanning line in the sub-display area.

7. An active matrix type liquid crystal display according to claim 3 wherein the active matrix type liquid crystal display is constructed such that at least one of a width or a length of the leader wiring of the scanning line in the main display area is different from a width or a length of the leader wiring of the scanning line in the sub-display area.

8. An active matrix type liquid crystal display according to claim 7 wherein the active matrix type liquid crystal display is constructed such that the pixel area in the main display area is smaller in size than the pixel area in the sub-display area, and that at least one of a width or length of the leader wiring of the scanning line in the main display area is narrower or longer than a width or length of the leader wiring of the scanning line in the sub-display area.

9. An active matrix type liquid crystal display according to claim 3 wherein the active matrix type liquid crystal display is constructed such that both the width and length of the leader wiring of the scanning line in the main display area are different from both the width and length of the leader wiring of the scanning line in the sub-display area respectively.

10. An active matrix type liquid crystal display according to claim 9 wherein the pixel area in the main display area is smaller in size than the pixel area in the sub-display area, and wherein both the width and length of the leader wiring of the scanning line in the main display area are narrower and longer than the width and length of the leader wiring of the scanning line in the sub-display area respectively.

11. An active matrix type liquid crystal display according to claim 3 wherein the pixel area in the main display area is smaller in size than the pixel area in the sub-display area, and wherein an area of a portion where the scanning lines and the signal lines overlap in the main display area is smaller than an area of a portion where the scanning lines and the signal lines overlap in the sub-display area.

12. An active matrix type liquid crystal display according to claim 3 wherein the pixel area in the main display area is smaller in size than the pixel area in the sub-display area, and wherein the channel width of TFT in the main display area is narrower than the channel width of TFT in the sub-display area.

13. An active matrix type liquid crystal display according to claim 3 wherein the pixel area in the main display area is smaller in size than the pixel area in the sub-display area, and wherein storage capacity of the main display area is smaller than storage capacity of the sub-display area.

14. An active matrix type liquid crystal display according to claim 3 wherein the pixel area in the main display area is smaller in size than the pixel area in the sub-display area, wherein the channel width of TFT in the main display area is narrower than the channel width of TFT in the sub-display area, and wherein the storage capacity of the main display area is smaller than the storage capacity of the sub-display area.

15. An active matrix type liquid crystal display wherein there is sandwiched a liquid crystal layer between a pair of substrates oppositely arranged; on the surface of one of the substrates, a plurality of scanning lines and a plurality of signal lines are formed to intersect each other in a matrix shape; in the vicinity of a plurality of intersected portions formed by the plurality of scanning lines and signal lines, there are formed respectively TFTs having gate electrodes connected to the scanning lines, pixel electrodes connected to the TFTs through drain electrodes, and storage capacity; there are provided a main display area and a sub-display area which have pixel areas different from each other in size respectively, each of the pixel areas being enclosed with the scanning lines and the signal lines; all around each display area, there is formed leader wiring for the scanning lines and leader wiring for the signal lines; on the surface of the other opposite substrate on the liquid crystal layer side, there is formed an opposite electrode; the pixel area in the main display area is smaller in size than the pixel area in the sub-display area; both the width and length of the leader wiring of the scanning line in the main display area are narrower and longer than the width and length of the leader wiring of the scanning line in the sub-display area respectively; an area of a portion where the scanning lines and the signal lines overlap in the main display area is smaller than an area of a portion where the scanning lines and the signal lines overlap in the sub-display area; the channel width of TFT in the main display,area is narrower than the channel width of TFT in the sub-display area; and the storage capacity of the main display area is smaller than the storage capacity of the sub-display area.

* * * * *

UNITED STATES PATENT AND TRADEMARK OFFICE
CERTIFICATE OF CORRECTION

PATENT NO.     : 6,587,174 B1
DATED          : July 1, 2003
INVENTOR(S)    : Akira Nakano It is certified that error appears in the above-identified patent and that said Letters Patent is hereby corrected as shown below:

Column 16,
Line 28, delete "display,area" and substitute -- display area -- in its place.

Signed and Sealed this

Thirtieth Day of September, 2003

JAMES E. ROGAN
*Director of the United States Patent and Trademark Office*